3,291,625
CELLULOSE ACETATE SOLUTIONS AND THE MANUFACTURE OF SELF - SUSTAINING FILMS THEREFROM
Giovanni Faraone and Alessandro Giorgetti, Cairo Montenotte, Italy, assignors to S.p.A. Ferrania
No Drawing. Filed June 7, 1962, Ser. No. 200,647
4 Claims. (Cl. 106—177)

This invention relates to cellulose acetate solutions and the manufacture of self-sustaining films therefrom.

More particularly, this invention concerns improvements in cellulose acetate solutions which permit obtaining from said solutions, at a higher coating speed, a photographic film base having overall properties at least equivalent to the film base in commercial use and having, in addition, the valuable property of being relatively non-inflammable.

It is known that the qualitative and quantitative production of films and sheets from cellulose ester solutions can be ameliorated by addition to said solutions of gelatinizing agents which usually belongs either to the class of the aliphatic or aromatic chlorinated hydrocarbons.

Thus, in the British Patents Nos. 640,730 and 640,731, corresponding to U.S. Patents Nos. 2,492,977 and 2,492,978 the preparation of solutions of cellulose acetate having an acetyl content of 42.5% to 44% in methylene chloride and methyl or ethyl alcohol with respectively the addition of ethylene chloride or propylene chloride, has been described.

Further, in British Patent No. 687,728, corresponding to U.S. Patent No. 2,607,704, the preparation of solutions of cellulose acetate having an acetyl content of 42.5% to 44% dissolved in a solvent mixture consisting essentially of methylene chloride, an unsubstituted aliphatic monohydric alcohol and cyclohexane, the cyclohexane being present in an amount between 4% and 11% by weight of the total solvent mixture, has been described.

The compositions according to the above mentioned specifications are, as far as we are aware, the first ones which permit obtaining self-sustaining films possessing the desirable physical requirements of the films prepared from cellulose nitrate, as high tensile strength, flexibility, moisture resistance and rigidity, even if they are relatively non-inflammable.

We have now found that it is possible to obtain cellulose acetate solutions which permit the production of a commercial self-sustaining film that not only possesses the desired and comparable properties to presently available cellulose ester films, but represents an improvement in its relative non-inflammability, speed of manufacture and in other features.

According to one feature of the present invention a cellulose acetate solution is composed essentially of cellulose acetate having an acetyl content of 42.5% to 44% dissolved in a solvent mixture consisting of methylene chloride, ethyl alcohol, a small content of plasticizer and, as a gelatinizing agent, a compound of the class of the organic esters of sucrose and/or glucose and/or, in particular, a sucrose organophosphorus ester.

We have found that the addition of compounds of the above mentioned class, in an amount within the range of 5 to 25 parts per 100 parts of cellulose acetate, to a solution of cellulose triacetate of the selected acetyl range will increase the coating speed in proportion to the amount added.

We have also found that for quality of product, the composition preferably should contain from 10 to 20 parts of gelatinizing agent for 100 parts of this type of cellulose acetate.

The compounds which are specific gelatinizing agents in this casting solvent combination are the organic sucrose esters as sucrose acetate isobutyrate, sucrose octaacetate, sucrose octabenzoate, the organic glucose esters as glucose pentabenzoate, and glucose pentaacetate, as well as the organophosphorus ester of sucrose being described in our co-pending application No. 200,648, filed June 7, 1962, now U.S. Patent No. 3,169,956, namely sucrose octadiphenyl phosphate.

Said compounds are commercially on sale except sucrose octadiphenyl phosphate, which was prepared for the first time according to our copending application No. 200,648.

The specific gelatinizing action of the aforesaid compounds may be more easily illustrated by the following example.

Example

A comparative usual solution (A) was prepared according to known methods, having following compositions:

| | Parts |
|---|---|
| Cellulose acetate (42.5% to 44% acetyl) | 100 |
| Methylene chloride | 540 |
| Methyl alcohol | 60 |
| Triphenyl phosphate | 15 | and further three other solutions (B), (C) and (D) were prepared according to the present invention, having the following compositions:

| | Parts |
|---|---|
| Cellulose acetate (42.5% to 44% acetyl) | 100 |
| Methylene chloride | 540 |
| Ethyl alcohol | 60 |
| Sucrose octadiphenyl phosphate— | |
| Solution (B) | 10 |
| Solution (C) | 15 |
| Solution (D) | 20 |
| Triphenyl phosphate | 15 |

The solutions (B), (C) and (D) show a viscosity which is nearly equal to that of the solution (A) and a higher filtrability.

The time on the casting surface was, for each solution:

| Solution | A | B | C | D |
|---|---|---|---|---|
| Time, min | 12' | 6' | 4'30'' | 3' |

Whereas for the aforesaid casting time the still fresh film resulting from solution (A), through nearly self sustaining, leaves when stripped some residual trails of its composition on the casting surface, the films resulting from the solution (B), (C) and (D) may be properly stripped without leaving residual trails.

Similar results were obtained by using other sucrose and/or glucose esters as for example sucrose acetate isobutyrate, sucrose octaacetate, sucrose octabenzoate etc., glucose pentaacetate, glucose pentabenzoate etc., alone or in a mixture.

By employing the organic esters according to the present invention several advantages in comparison with the earlier methods of preparing self-sustaining films from cellulose esters solution containing liquid gelatinizing agents are reached.

Thus, besides (1) an improvement in the technology of preparing the casting solutions, due to the greater simplicity of the solvent mixture, (2) a higher filtration speed, (3) an improvement due to the employment of solutions with a higher solid content, and a consequent minor amount of the solvents employed, (4) a higher speed of manufacture due to the shorter time of permanence on the casting surface, (5) in certain cases, an improvement in the flame-resistance of the finished product, depending from the major amount of phosphorus phenyl groups being present in the gelatinizing agent, (6) finally, the elimination of the recovery phase of the liquid gelatinizing agent as well as of the rectifying operations for the recovered solvents, were reached.

What we claim is:

1. A method of producing a self-sustaining film of low flammability, comprising establishing a methylene chloride solution of cellulose acetate having an acetyl content of about 42.5 to 44% and 5 to 25 parts by weight of sucrose octadiphenyl phosphate per 100 parts of said cellulose acetate, casting a film of said solution on a solid substrate, whereby a readily strippable film is quickly formed, and stripping said film from said solid substrate.

2. A method as claimed in claim 1, in which said sucrose octadiphenyl phosphate is present in an amount of 10 to 20 parts by weight per 100 parts of said cellulose acetate.

3. A methylene chloride solution of cellulose acetate having an acetyl content of about 42.5 to 44%, capable of being rapidly formed into a film of low flammability, and containing 5 to 25% by weight of sucrose octadiphenyl phosphate, based on the weight of the cellulose acetate.

4. A solution as claimed in claim 3, in which said sucrose octadiphenyl phosphate is present in an amount of 10 to 20% by weight based on the weight of the cellulose acetate.

References Cited by the Examiner

UNITED STATES PATENTS

| | | | |
|---|---|---|---|
| 2,931,802 | 4/1960 | Tovey et al. | 106—162 |
| 2,987,409 | 6/1961 | Valls et al. | 106—196 |
| 3,057,743 | 10/1962 | Tovey et al. | 106—162 |
| 3,076,718 | 2/1963 | Gearhart et al. | 106—180 |

ALEXANDER H. BRODMERKEL, *Primary Examiner.*

M. LIEBMAN, *Examiner.*

A. LIEBERMAN, L. B. HAYES, *Assistant Examiners.*